(12) United States Patent
Shi et al.

(10) Patent No.: US 11,506,567 B2
(45) Date of Patent: Nov. 22, 2022

(54) ASPHERIC LENS ECCENTRICITY DETECTING DEVICE BASED ON WAVEFRONT TECHNOLOGY AND DETECTING METHOD THEREOF

(71) Applicant: Suzhou institute of Biomedical Engineering and Technology, Chinese Academy of Sciences, Jiangsu Province (CN)

(72) Inventors: Guohua Shi, Jiangsu Province (CN); Yi He, Sichun Province (CN); Feng Gao, Jiangxi Province (CN); Lina Xing, Jilin Province (CN); Xin Zhang, Jiangsu Province (CN); Wen Kong, Shandong Province (CN)

(73) Assignee: Suzhou Institute of Biomedical Engineering and Technology, Chinese Academy of Sciences, Jiangsu Province (CN)

( * ) Notice: Subject to any disclaimer, the term of this patent is extended or adjusted under 35 U.S.C. 154(b) by 65 days.

(21) Appl. No.: 16/616,158

(22) PCT Filed: Dec. 12, 2018

(86) PCT No.: PCT/CN2018/120449
§ 371 (c)(1),
(2) Date: Nov. 22, 2019

(87) PCT Pub. No.: WO2020/103221
PCT Pub. Date: May 28, 2020

(65) Prior Publication Data
US 2021/0270694 A1 Sep. 2, 2021

(30) Foreign Application Priority Data
Nov. 22, 2018 (CN) .......................... 201811399344.9

(51) Int. Cl.
*G01M 11/02* (2006.01)

(52) U.S. Cl.
CPC .... *G01M 11/0221* (2013.01); *G01M 11/0242* (2013.01); *G01M 11/0257* (2013.01)

(58) Field of Classification Search
CPC .......... G01M 11/0221; G01M 11/242; G01M 11/0257; G01N 2021/1765; G01N 21/17
See application file for complete search history.

(56) References Cited

U.S. PATENT DOCUMENTS

| | | | |
|---|---|---|---|
| 5,548,396 | A | 8/1996 | Morita et al. |
| 2008/0304080 | A1 | 12/2008 | Ueki |
| 2014/0152999 | A1 | 6/2014 | Kulawiec et al. |

FOREIGN PATENT DOCUMENTS

| | | |
|---|---|---|
| CN | 101210857 A | 7/2008 |
| CN | 101275826 A | 10/2008 |

(Continued)

OTHER PUBLICATIONS

PCT International Search Report (Application PCT/CN2018/120449), dated Aug. 6, 2019.

(Continued)

*Primary Examiner* — Dominic J Bologna
*Assistant Examiner* — Amanda Merlino
(74) *Attorney, Agent, or Firm* — Elmore Patent Law Group, P.C.; Carolyn S. Elmore; Joseph C. Zucchero (57) ABSTRACT

The present invention discloses an aspheric lens eccentricity detecting device based on wavefront technology and a detecting method thereof. The device comprises: an upper optical fiber light source, an upper collimating objective lens, an upper light source spectroscope, an upper beam-contracting front lens, an upper beam-contracting rear lens, an upper imaging detector, an upper imaging spectroscope, an upper wavefront sensor, a lens-under-detection clamping (Continued)

mechanism, a lower light source spectroscope, a lower beam-contracting front lens, a lower beam-contracting rear lens, a lower imaging spectroscope, a lower wavefront sensor, a lower imaging detector, a lower collimating objective lens and a lower optical fiber light source. The present invention achieves non-contact detection, with no risk of damaging the lens, and there is no moving part in the device, so the system reliability and stability are high; and in the present invention, various eccentricity errors in the effective aperture of the aspheric lens can be detected at a time, thereby avoiding errors caused by splicing detection, and also greatly reducing the detection time, thus being applicable to online detection on an assembly line.

11 Claims, 7 Drawing Sheets

(56) References Cited

FOREIGN PATENT DOCUMENTS

| CN | 101281025 A | 10/2008 |
|---|---|---|
| CN | 100582715 C | 1/2010 |
| CN | 101226344 B | 6/2010 |
| CN | 102200432 A | 9/2011 |
| CN | 102944194 B | 4/2015 |
| CN | 207540510 U | 6/2018 |
| EP | 2369319 A2 | 9/2011 |
| JP | 2000193441 A | 7/2000 |
| JP | 2005201703 A | 7/2005 |
| JP | 2008096233 A | 4/2008 |
| JP | 2014115077 A | 6/2014 |
| KR | 20150080563 A | 7/2015 |

OTHER PUBLICATIONS

Written opinion of the PCT International Searching Authority Application No. PCT/CN2018/120449), dated Aug. 6, 2019.
English translation of Notification of First Office Action of 201811399344.9, dated May 7, 2020.
Extended Search Report of 18919386.5, dated Jul. 16, 2020.
Ma, Z. et al., "Study on Optical Centering of Aspheric Mirror by Interferometry", ACTA Photonica Sinica, vol. 37., No. 7, Jul. 2008, p. 4.
Second Office Action dated Dec. 7, 2021 in JP2019-565415 (with translation).
English translation of First Office Action of 10-2019-7034821, dated Dec. 1, 2020.

ASPHERIC LENS ECCENTRICITY DETECTING DEVICE BASED ON WAVEFRONT TECHNOLOGY AND DETECTING METHOD THEREOF

RELATED APPLICATIONS

This application US National stage entry of International Application No. PCT/US2018/120449, which designated the United States and was filed on Dec. 12, 2018, published in Chinese. This application claims priority under 35 U.S.C. § 119 China, Application No. 201811399344.9, filed Nov. 22, 2018. The entire teachings of the above applications are incorporated herein by reference.

FIELD OF THE INVENTION

The present invention relates to the field of optical detection technology, in particular to an aspheric lens eccentricity detecting device based on wavefront technology and a detecting method thereof.

BACKGROUND OF THE INVENTION

Aspheric lenses have been widely used in space remote sensing optical lenses, lithography lenses, optical detection instruments and camera optical systems, because of their advantages such as alleviating the optical system design difficulty, simplifying the structure, increasing the field of view and improving the numerical aperture due to their excellent optical properties. An alignment error or other inevitable errors of the aspheric lens during the manufacturing process, such as an error caused by uneven cooling of the material or the like, can lead to tilt and eccentricity errors of two curved surface optical axes of the lens, wherein the tilt error causes the lens to introduce distortion and coma into the optical system, and the eccentricity error can introduce additional spherical aberration, and both errors can lower the optical quality of the aspheric lens and also mechanical properties of the lens.

For the eccentricity detection of an aspheric lens, with Panasonic's UA3P contact detection as the mainstream product, the detection principle is that surfaces of the aspheric lens are scanned point by point through a single-point probe, and all surface data of each surface can be obtained in this way. The method is highly accurate, but takes a long time, resulting in low efficiency; moreover, the requirement on the lens fixing accuracy is very high during the measurement process, with a risk of damaging the lens surfaces.

To improve the efficiency, a variety of non-contact eccentricity detecting methods have also been popularized and applied, including optical imaging and surface interference detecting methods. The optical imaging method mainly uses a focusing telescope structure to generate a spherical wave matching a lens surface, and a circle formed on an imaging camera by rotation of a point or crosshair image reflected from the lens surface with a rotation axis is used to determine the deviation of the optical axis of the lens surface from the rotation axis. The measurement accuracy of this method strictly depends on the accuracy of the rotation axis, and also depends on the dimensional accuracy of the point source or crosshair, and the measurement accuracy is not high, usually in a few arc seconds. The surface interference method (such as in Chinese patents CN101226344B and CN102944194B) uses interference fringes on a lens surface to measure the surface tilt. Its centering measurement accuracy is higher than that of the optical imaging method and restricted by the transverse and longitudinal resolutions of interferometry measurement which are not high, it often needs scanning interference by regions, and the entire aspheric surface shape and eccentricity error are obtained by splicing. The measurement accuracy depends on the position control precision of an objective table and the accuracy of a splicing algorithm, and with the increase of the aspheric aperture, the efficiency decreases exponentially, and the accuracy also drops dramatically. In addition, the interferometry measurement method is difficult for aspheric detection of large deviations and large deviation slopes. The interferometry measurement method is relatively complicated, with high requirements on operators and low practicability.

It can be seen neither of the contact and non-contact aspheric eccentricity detecting devices and methods can have both desired measurement accuracy and measurement efficiency.

SUMMARY OF THE INVENTION

A technical problem to be solved by the present invention is providing an aspheric lens eccentricity detecting device based on wavefront technology and a detecting method thereof, in view of the drawbacks in the prior art. Its eccentricity measurement accuracy does not depend on any other moving or rotating mechanism. Using a wavefront measurement and pupil imaging method, fast and accurate aspheric lens eccentricity detection can be achieved in a non-contact manner.

To solve the above technical problem, the present invention adopts the following technical solution: an aspheric lens eccentricity detecting device based on wavefront technology includes an upper optical fiber light source, an upper collimating objective lens, an upper light source spectroscope, an upper beam-contracting front lens, an upper beam-contracting rear lens, an upper imaging detector, an upper imaging spectroscope, an upper wavefront sensor, a lens-under-detection clamping mechanism, a lower light source spectroscope, a lower beam-contracting front lens, a lower beam-contracting rear lens, a lower imaging spectroscope, a lower wavefront sensor, a lower imaging detector, a lower collimating objective lens and a lower optical fiber light source, wherein light emitted by the upper optical fiber light source is collimated by the upper collimating objective lens, then is transmitted through the upper light source spectroscope, and becomes incident to an upper surface of a lens under detection on the lens-under-detection clamping mechanism; the reflected light on the upper surface of the lens under detection is reflected by the upper light source spectroscope, then is subjected to aperture matching by the upper beam-contracting front lens and the upper beam-contracting rear lens successively, and reaches the upper imaging spectroscope, and the light is divided into two parts after reaching the upper imaging spectroscope, one part thereof being reflected by the upper imaging spectroscope and entering the upper imaging detector, and the other part thereof being transmitted through the upper imaging spectroscope and entering the upper wavefront sensor; the upper imaging detector acquires an image formed by the reflected light on the upper surface of the lens under detection, and processes a variable-curvature ring image in the acquired image to obtain an optical axis center position of the upper surface of the lens under detection; and the upper wavefront sensor acquires distortion information of the reflected light on the upper surface of the lens under detection, and processes the distortion information to obtain tilt information of the upper surface of the lens under detection; and wherein light emitted by the lower optical fiber light source is collimated by the lower collimating objective lens, then is transmitted through the lower light source spectroscope, and becomes incident to a lower surface of the lens under detection on the lens-under-detection clamping mechanism; the reflected light on the lower surface of the lens under detection is reflected by the lower light source spectroscope, then is subjected to aperture matching by the lower beam-contracting front lens and the lower beam-contracting rear lens successively, and reaches the lower imaging spectroscope, and the light is divided into two parts after reaching the lower imaging spectroscope, one part thereof being reflected by the lower imaging spectroscope and entering the lower imaging detector, and the other part thereof being transmitted through the lower imaging spectroscope and entering the lower wavefront sensor; the lower imaging detector acquires an image formed by the reflected light on the lower surface of the lens under detection, and processes a variable-curvature ring image in the acquired image to obtain an optical axis center position of the lower surface of the lens under detection; and the lower wavefront sensor acquires distortion information of the reflected light on the lower surface of the lens under detection, and processes the distortion information to obtain tilt information of the lower surface of the lens under detection.

Preferably, the light emitted by the lower optical fiber light source is collimated by the lower collimating objective lens to form a parallel light beam, which is transmitted through the lower light source spectroscope, becomes incident to the lens under detection on the lens-under-detection clamping mechanism, and is reflected by the upper light source spectroscope after passing through the lens under detection, and then the light reflected therefrom is subjected to aperture matching by the upper beam-contracting front lens and the upper beam-contracting rear lens successively, and reaches the upper imaging spectroscope; and part of the light is reflected by the upper imaging spectroscope and reaches the upper imaging detector to form a light transmittance image of the lens under detection, and an outer edge image of the lens under detection in the formed image is processed to obtain an outer diameter center position of the upper surface of the lens under detection.

Preferably, the light emitted by the upper optical fiber light source is collimated by the upper collimating objective lens to form a parallel light beam, which is transmitted through the upper light source spectroscope, becomes incident to the lens under detection on the lens-under-detection clamping mechanism, and is reflected by the lower light source spectroscope after passing through the lens under detection, and then the light reflected therefrom is subjected to aperture matching by the lower beam-contracting front lens and the lower beam-contracting rear lens successively, and reaches the lower imaging spectroscope; and part of the light is reflected by the lower imaging spectroscope and reaches the lower imaging detector to form a light transmittance image of the lens under detection, and an outer edge image of the lens under detection in the formed image is processed to obtain an outer diameter center position of the lower surface of the lens under detection.

Preferably, the positions of the upper imaging detector and the upper wavefront sensor in the optical path are both conjugate with the upper surface of the lens under detection; and the positions of the lower imaging detector and the lower wavefront sensor in the optical path are both conjugate with the lower surface of the lens under detection.

Preferably, the wavefront sensor is a Hartmann wavefront sensor or a shearing interference wavefront sensor or a quadrangular pyramid wavefront sensor.

Preferably, optical axis center position information of the upper surface, tilt information of the upper surface, outer diameter center position information of the upper surface, optical axis center position information of the lower surface, outer diameter center position information of the lower surface, and tilt information of the lower surface obtained for the lens under detection are subjected to comprehensive processing, to finally obtain data of face-wise translation eccentricity of the upper and lower surfaces, face-wise tilt eccentricity of the upper and lower surfaces, outer diameter eccentricity of the upper surface, and outer diameter eccentricity of the lower surface, of the lens under detection, thereby measuring eccentricity error information of the lens under detection.

A detecting method for the aspheric lens eccentricity detecting device based on wavefront technology as described above includes the following steps:

step S1: turning on the upper optical fiber light source, the upper imaging detector and the upper wavefront sensor simultaneously, and adjusting the lens-under-detection clamping mechanism according to an image on the upper imaging detector, to adjust the position of the lens under detection to an imaging center area of the upper imaging detector;

step S2: acquiring an image on the upper wavefront sensor and processing the wavefront image to obtain an amount of tilt $(p_x, p_y)$ of the upper surface of the lens under detection;

step S3: acquiring a pupil image $J_p$ on the upper imaging detector, and processing the pupil image to obtain an optical axis center position $(O_x, O_y)$ of the upper surface of the lens under detection;

step S4: turning off the upper optical fiber light source, turning on the lower optical fiber light source, acquiring a pupil image $I_p$ on the upper imaging detector, and performing calculation processing on the pupil image $I_p$ by using the method of step S3 to obtain an outer diameter center position $(d_x, d_y)$ of the upper surface of the lens under detection;

step S5: turning on the lower imaging detector and the lower wavefront sensor, acquiring an image on the lower wavefront sensor, and performing calculation processing according to component parameters of the lower wavefront sensor by using the method of step S2 to obtain an amount of tilt $(p_x', p_y')$ of the lower surface of the lens under detection;

step S6: acquiring a pupil image $J_p'$ on the lower imaging detector, and performing calculation processing on the pupil image $J_p'$ by using the method of step S3 to obtain an optical axis center position (Ox', Oy') of the lower surface of the lens under detection;

step S7: turning off the lower optical fiber light source, turning on the upper optical fiber light source, acquiring a pupil image $I'_p$ on the lower imaging detector, and performing calculation processing on the pupil image $I'_p$ by using the method of step S3 to obtain an outer diameter center position $(d_x', d_y')$ of the lower surface of the lens under detection;

step S8: subtracting the amount of tilt of the upper surface of the lens under detection obtained in step S2 from the amount of tilt of the lower surface obtained in step S5 to obtain face-wise tilt eccentricity of the upper and lower surfaces of the lens under detection: $(\overline{p_x}, \overline{p_y})=(p_x', p_y')-(p_x, p_y)$; and subtracting the optical axis center position of the upper surface obtained in step S3 from the optical axis center position of the lower surface obtained in step S6, to obtain face-wise translation eccentricity of the upper and lower surfaces of the lens under detection: $O=(O_x', O_y')-(O_x, O_y)$;

step S9: according to the optical axis center position $(O_x, O_y)$ of the upper surface obtained in step S3 and the outer diameter center position $(d_x, d_y)$ of the upper surface obtained in step S4, obtaining outer diameter eccentricity of the upper surface of the lens under detection:

$$D = \frac{p}{K}(d_x - O_x, d_y - O_y)$$

wherein the parameter K is a magnification of a beam-contracting-expanding optical system composed of the upper beam-contracting front lens and the upper beam-contracting rear lens, and the parameter p is the pixel size of the upper imaging detector; and step S10: according to the optical axis center position $(O_x', O_y')$ of the lower surface obtained in step S6 and the outer diameter center position $(d_x', d_y')$ of the lower surface obtained in step S7, obtaining outer diameter eccentricity of the lower surface of the lens under detection:

$$D' = \frac{p'}{K'}(d_x' - O_x', d_y' - O_y')$$

wherein the parameter k' is a magnification of a beam-contracting-expanding optical system composed of the lower beam-contracting front lens and the lower beam-contracting rear lens, and the parameter p' is the pixel size of the lower imaging detector.

Preferably, step S2 specifically includes:

step S21: acquiring a wavefront image on the upper wavefront sensor;

step S22: detecting effective sub-apertures of the outermost ring in the wavefront image, after removing sub-apertures of the outermost circle and the innermost circle thereof, the remaining sub-apertures being referred to as effective sub-apertures; and letting the number of the effective sub-apertures be L, and calculating the slope of each effective sub-aperture, denoted by $(g_{xi}, g_{yi})$, wherein i= 1, 2, . . . , L;

step S23: calculating the average slope of the effective sub-apertures:

$$(g_x, g_y) = \frac{1}{L}\sum_{i=1}^{L}(g_{xi}, g_{yi});$$

and step S24: calculating the amount of tilt of the upper surface of the lens under detection:

$$(p_x, p_y) = \frac{p}{K \cdot q} \cdot (g_x, g_y),$$

wherein the parameter K is a magnification of a beam-contracting-expanding optical system composed of the upper beam-contracting front lens and the upper beam-contracting rear lens, the parameter p is the pixel size of a detecting camera of the upper wavefront sensor, and the parameter q is the sub-aperture size of the upper wavefront sensor.

Preferably, step S3 specifically includes:

step S31: acquiring a pupil image $J_p$ on the upper imaging detector;

step S32: binarizing the pupil image $J_p$ to obtain a binarized image $J_{p2}$, wherein a binarization threshold is set by manually specifying a threshold or using an automatic threshold calculation method;

step S33: performing edge extraction on the binarized image $J_{p2}$ to obtain an image $J_{p3}$; and step S34: performing a circle Hough transformation on the image $J_{p3}$ to obtain a circle, and extracting the center of the circle, denoted as (Ox, Oy), which is the optical axis center position of the upper surface of the lens under detection.

Preferably, edge extraction is performed on the binarized image $J_{p2}$ by using a Sobel operator or a Laplacian operator or a Canny operator in step S33.

The present invention has the following beneficial effects:

(1) The aspheric lens eccentricity detecting device based on wavefront technology of the present invention performs non-contact detection, with no risk of damaging the lens, and there is no moving part in the device, so the system reliability and stability are high.

(2) In the present invention, various eccentricity errors in the effective aperture of the aspheric lens can be detected at a time, thereby avoiding errors caused by splicing detection, and also greatly reducing the detection time, thus being applicable to online detection on an assembly line.

(3) The present invention adopts the wavefront measurement technology to achieve the detection of the eccentricity errors of the upper and lower surfaces of the aspheric lens, and the measurement precision can reach the sub-nanometer order.

(4) The aspheric lens eccentricity detecting device based on wavefront technology of the present invention is simple and compact in system structure, low in complexity, and convenient for calculation and analysis, and is suitable for various use occasions, and convenient for large-scale popularization and application.

REFERENCE NUMERALS upper optical fiber light source 1, upper collimating objective lens 2, upper light source spectroscope 3, upper beam-contracting front lens 4, upper beam-contracting rear lens 5, upper imaging detector 6, upper imaging spectroscope 7, upper wavefront sensor 8, lens-under-detection clamping mechanism 9, lower light source spectroscope 10, lower beam-contracting front lens 11, lower beam-contracting rear lens 12, lower imaging spectroscope 13, lower wavefront sensor 14, lower imaging detector 15, lower collimating objective lens 16, lower optical fiber light source 17.

DETAILED DESCRIPTION OF THE EMBODIMENTS

The present invention will be further described in detail below in conjunction with the embodiments, so that those skilled in the art can carry it out with reference to the description.

It should be understood that, as used herein, the terms such as "have", "include" and "comprise" do not preclude the presence or addition of one or more other elements or combinations thereof.

Figure 1:
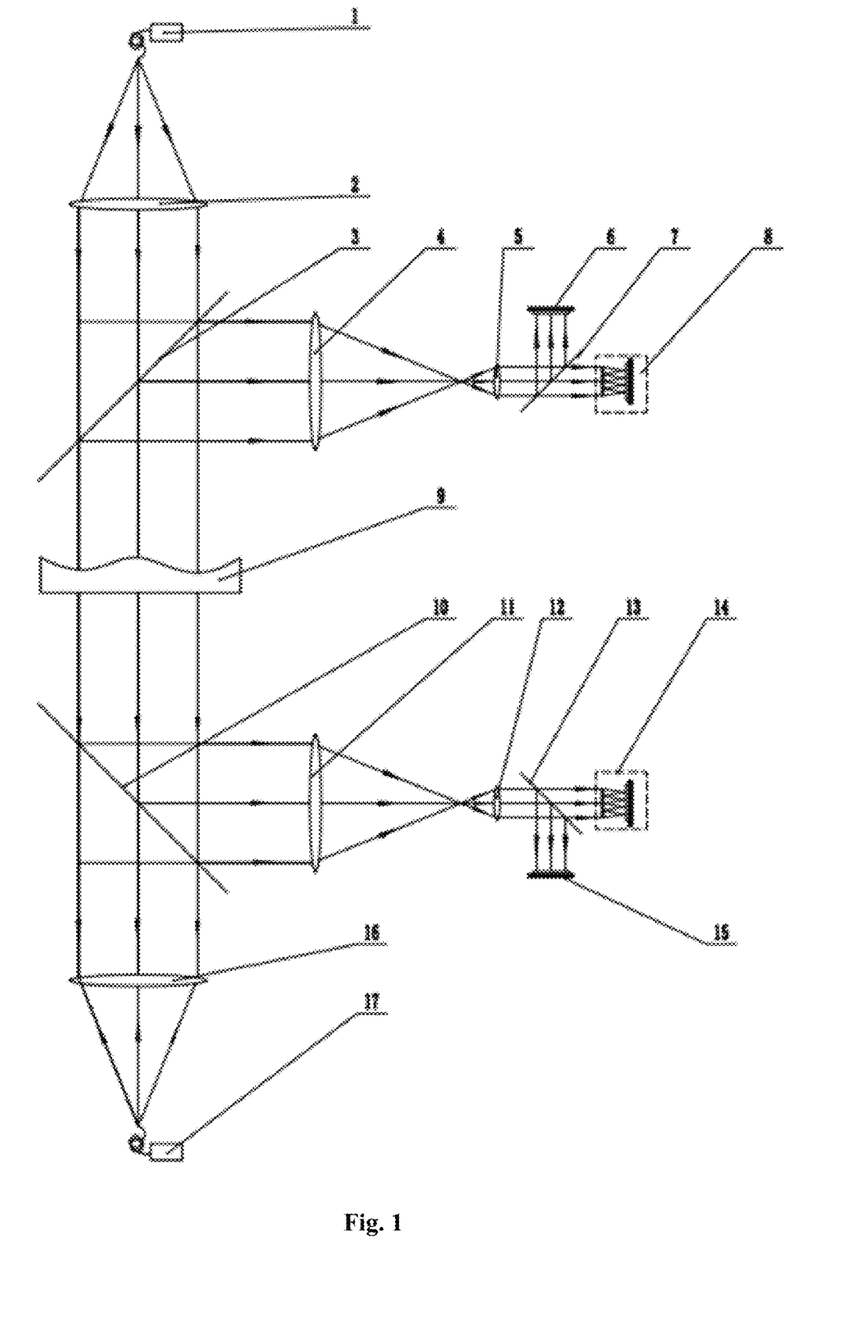
FIG. 1 is a structure diagram of an aspheric lens eccentricity detecting device based on wavefront technology of the present invention.

As shown in FIG. 1, an aspheric lens eccentricity detecting device based on wavefront technology in the embodiment includes an upper optical fiber light source 1, an upper collimating objective lens 2, an upper light source spectroscope 3, an upper beam-contracting front lens 4, an upper beam-contracting rear lens 5, an upper imaging detector 6, an upper imaging spectroscope 7, an upper wavefront sensor 8, a lens-under-detection clamping mechanism 9, a lower light source spectroscope 10, a lower beam-contracting front lens 11, a lower beam-contracting rear lens 12, a lower imaging spectroscope 13, a lower wavefront sensor 14, a lower imaging detector 15, a lower collimating objective lens 16 and a lower optical fiber light source 17.

The wavefront sensor is a Hartmann wavefront sensor or a shearing interference wavefront sensor or a quadrangular pyramid wavefront sensor. Preferably, a Hartmann wavefront sensor is adopted in the embodiment.

Light emitted by the upper optical fiber light source 1 is collimated by the upper collimating objective lens 2 to form a parallel light beam, which is transmitted through the upper light source spectroscope 3 and reaches the lens-under-detection clamping mechanism 9, and an upper surface of the lens under detection clamped on the lens-under-detection clamping mechanism 9 reflects the incident parallel light, and the reflected light is reflected by the upper light source spectroscope 3 and then is subjected to aperture matching by the upper beam-contracting front lens 4 and the upper beam-contracting rear lens 5, and reaches the upper imaging spectroscope 7. The light is divided into two parts after reaching the upper imaging spectroscope 7, one part thereof being reflected by the upper imaging spectroscope 7 and entering the upper imaging detector 6, and the other part thereof being transmitted through the upper imaging spectroscope 7 and entering the upper wavefront sensor 8. The positions of the upper imaging detector 6 and the upper wavefront sensor 8 in the optical path are both conjugate with the upper surface of the lens under detection. The upper imaging detector 6 acquires an image formed by the reflected light on the upper surface of the lens under detection, and processes a variable-curvature ring image in the acquired image to obtain an optical axis center position of the upper surface of the lens under detection; and the upper wavefront sensor 8 acquires distortion information of the reflected light on the upper surface of the lens under detection, and processes the distortion information to obtain tilt information of the upper surface of the lens under detection.

Light emitted by the lower optical fiber light source 17 is collimated by the lower collimating objective lens 16 to form a parallel light beam, which is transmitted through the lower light source spectroscope 10, then reaches the lens-under-detection clamping mechanism 9, and is transmitted through the lens under detection clamped on the lens-under-detection clamping mechanism 9 and reflected by the upper light source spectroscope 3, and the reflected light, after reflected by the upper light source spectroscope 3, is subjected to aperture matching by the upper beam-contracting front lens 4 and the upper beam-contracting rear lens 5, and reaches the upper imaging spectroscope 7. Part of the light that is reflected by the upper imaging spectroscope 7 is detected by the upper imaging detector 6 to form a light transmittance image of the lens under detection, and an outer edge image of the lens under detection in the formed image is processed to obtain an outer diameter center position of the upper surface of the lens under detection.

Light emitted by the lower optical fiber light source 17 is collimated by the lower collimating objective lens 16 to form a parallel light beam, which is transmitted through the lower light source spectroscope 10 and reaches the lens-under-detection clamping mechanism 9, and a lower surface of the lens under detection clamped on the lens-under-detection clamping mechanism 9 reflects the incident parallel light, and the reflected light is reflected by the lower light source spectroscope 10 and then is subjected to aperture matching by the lower beam-contracting front lens 11 and the lower beam-contracting rear lens 12, and reaches the lower imaging spectroscope 13. The light is divided into two parts after reaching the lower imaging spectroscope 13, one part thereof being reflected by the lower imaging spectroscope 13 and entering the lower imaging detector 15, and the other part thereof being transmitted through the lower imaging spectroscope 13 and entering the lower wavefront sensor 14. The positions of the lower imaging detector 15 and the lower wavefront sensor 14 in the optical path are both conjugate with the lower surface of the lens under detection. The lower imaging detector 15 acquires an image formed by the reflected light on the lower surface of the lens under detection, and processes a variable-curvature ring image in the acquired image to obtain an optical axis center position of the lower surface of the lens under detection; and the lower wavefront sensor 14 acquires distortion information of the reflected light on the lower surface of the lens under detection, and processes the distortion information to obtain tilt information of the lower surface of the lens under detection.

Light emitted by the upper optical fiber light source 1 is collimated by the upper collimating objective lens 2 to form a parallel light beam, which is transmitted through the upper light source spectroscope 3, then reaches the lens-under-detection clamping mechanism 9, and is transmitted through the lens under detection clamped on the lens-under-detection clamping mechanism 9 and reflected by the lower light source spectroscope 10, and the reflected light, after being reflected by the lower light source spectroscope 10, is subjected to aperture matching by the lower beam-contracting front lens 11 and the lower beam-contracting rear lens 12, and reaches the lower imaging spectroscope 13. Part of the light that is reflected by the lower imaging spectroscope 13 is detected by the lower imaging detector 15 to form a light transmittance image of the lens under detection, and an outer edge image of the lens under detection in the formed image is processed to obtain an outer diameter center position of the lower surface of the lens under detection.

Optical axis center position information of the upper surface, tilt information of the upper surface, outer diameter center position information of the upper surface, optical axis center position information of the lower surface, tilt information of the lower surface, and outer diameter center position information of the lower surface obtained for the lens under detection as described above are subjected to comprehensive processing to finally obtain data of face-wise translation eccentricity of the upper and lower surfaces, face-wise tilt eccentricity of the upper and lower surfaces, outer diameter eccentricity of the upper surface, and outer diameter eccentricity of the lower surface, of the lens under detection, thereby measuring eccentricity error information of the lens under detection.

The embodiment further provides a detecting method for the aspheric lens eccentricity detecting device based on wavefront technology, including the following steps:

step S1: turning on the upper optical fiber light source 1, the upper imaging detector 6 and the upper wavefront sensor 8 simultaneously, and adjusting the lens-under-detection clamping mechanism 9 according to an image on the upper imaging detector 6, to adjust the position of the lens under detection to an imaging center area of the upper imaging detector 6;

step S2: acquiring an image on the upper wavefront sensor 8 and processing the wavefront image to obtain an amount of tilt $(p_x, p_y)$ of the upper surface of the lens under detection;

step S3: acquiring a pupil image $J_p$ on the upper imaging detector 6, and processing the pupil image to obtain an optical axis center position $(O_x, O_y)$ of the upper surface of the lens under detection;

step S4: turning off the upper optical fiber light source 1, turning on the lower optical fiber light source 17, acquiring a pupil image $I_p$ on the upper imaging detector 6, and performing calculation processing on the pupil image $I_p$ by using the method of step S3 to obtain an outer diameter center position $(d_x, d_y)$ of the upper surface of the lens under detection;

step S5: turning on the lower imaging detector 15 and the lower wavefront sensor 14, acquiring an image on the lower wavefront sensor 14, and performing calculation processing according to component parameters of the lower wavefront sensor by using the method of step S2 to obtain an amount of tilt $(p_x', p_y')$ of the lower surface of the lens under detection;

step S6: acquiring a pupil image $J_p'$ on the lower imaging detector 15, and performing calculation processing on the pupil image $J_p'$ by using the method of step S3 to obtain an optical axis center position (Ox', Oy') of the lower surface of the lens under detection;

step S7: turning off the lower optical fiber light source 17, turning on the upper optical fiber light source 1, acquiring a pupil image $I_p'$ on the lower imaging detector 15, and performing calculation processing on the pupil image $I_p'$ by using the method of step S3 to obtain an outer diameter center position $(d_x', d_y')$ of the lower surface of the lens under detection;

step S8: subtracting the amount of tilt of the upper surface of the lens under detection obtained in step S2 from the amount of tilt of the lower surface obtained in step S5 to obtain face-wise tilt eccentricity of the lens under detection: $(\overline{p_x}, \overline{p_y}) = (p_x', p_y') - (p_x, p_y)$; and subtracting the optical axis center position of the upper surface obtained in step S3 from the optical axis center position of the lower surface obtained in step S6, to obtain face-wise translation eccentricity of the lens under detection: $O = (O_x', O_y') - (O_x, O_y)$;

step S9: according to the optical axis center position $(O_x, O_y)$ of the upper surface obtained in step S3 and the outer diameter center position $(d_x, d_y)$ of the upper surface obtained in step S4, obtaining outer diameter eccentricity of the upper surface of the lens under detection:

$$D = \frac{p}{K}(d_x - O_x, d_y - O_y)$$

wherein the parameter K is a magnification of a beam-contracting-expanding optical system composed of the upper beam-contracting front lens 4 and the upper beam-contracting rear lens 5, and the parameter p is the pixel size of the upper imaging detector 6; and step S10: according to the optical axis center position $(O_x', O_y')$ of the lower surface obtained in step S6 and the outer diameter center position $(d_x', d_y')$ of the lower surface obtained in step S7, obtaining outer diameter eccentricity of the lower surface of the lens under detection:

$$D' = \frac{p'}{K'}(d_x' - O_x', d_y' - O_y')$$

wherein the parameter k' is a magnification of a beam-contracting-expanding optical system composed of the lower beam-contracting front lens 11 and the lower beam-contracting rear lens 12, and the parameter p' is the pixel size of the lower imaging detector 15.

Step S2 specifically further includes:

step S21: acquiring a wavefront image on the upper wavefront sensor 8;

step S22: detecting effective sub-apertures of the outermost ring in the wavefront image, after removing sub-apertures of the outermost circle and the innermost circle thereof, the remaining sub-apertures being referred to as effective sub-apertures; and letting the number of the effective sub-apertures be L, and calculating the slope of each effective sub-aperture, denoted by $(g_{xi}, g_{yi})$, wherein i=1, 2, . . . , L;

step S23: calculating the average slope of the effective sub-apertures:

$$(g_x, g_y) = \frac{1}{L}\sum_{i=1}^{L}(g_{xi}, g_{yi});$$

and step S24: calculating the amount of tilt of the upper surface of the lens under detection:

$$(p_x, p_y) = \frac{p}{K \cdot q} \cdot (g_x, g_y),$$

wherein the parameter K is a magnification of a beam-contracting-expanding optical system composed of the upper beam-contracting front lens 4 and the upper beam-contracting rear lens 5, the parameter p is the pixel size of a detecting camera of the upper wavefront sensor 8, and the parameter q is the sub-aperture size of the upper wavefront sensor 8.

Step S3 specifically further includes:

step S31: acquiring a pupil image $J_p$ on the upper imaging detector 6;

step S32: binarizing the pupil image $J_p$ to obtain a binarized image $J_{p2}$, wherein a binarization threshold is set by manually specifying a threshold or using an automatic threshold calculation method;

step S33: performing edge extraction on the binarized image $J_{p2}$ to obtain an image $J_{p3}$, by using a method with a Sobel operator, a Laplacian operator, a Canny operator or the like; and step S34: performing a circle Hough transformation on the image $J_{p3}$ to obtain a circle, and extracting the center of the circle, denoted as (Ox, Oy), which is the optical axis center position of the upper surface of the lens under detection.

Figure 2:
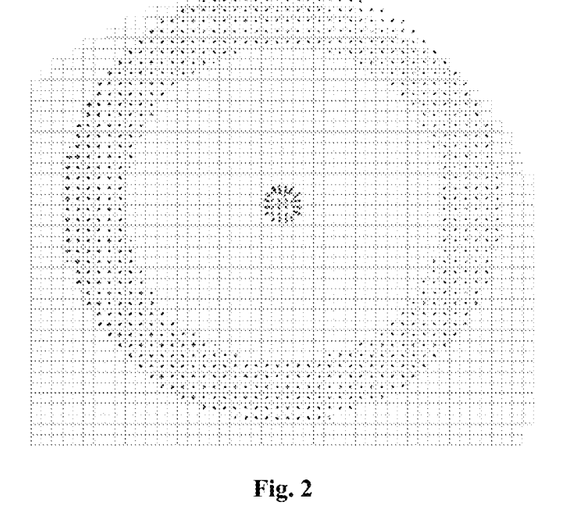
FIG. 2 shows a tilt wavefront image of an upper surface obtained by an upper wavefront sensor in an embodiment of the present invention.
Figure 3:
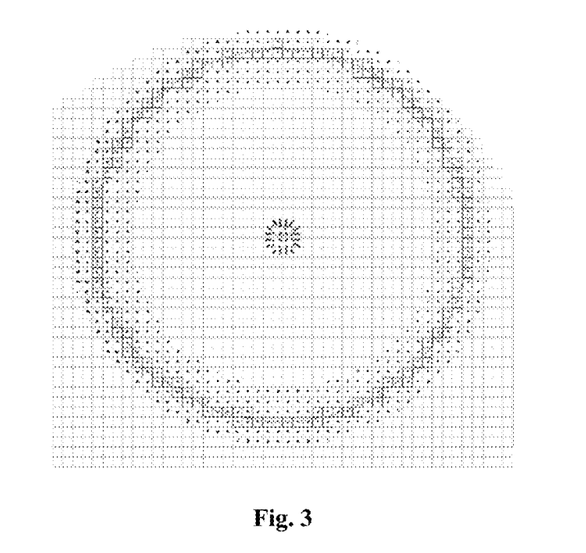
FIG. 3 shows a tilt amount image of the upper surface obtained after processing by an upper wavefront sensor in an embodiment of the present invention.
Figure 4:
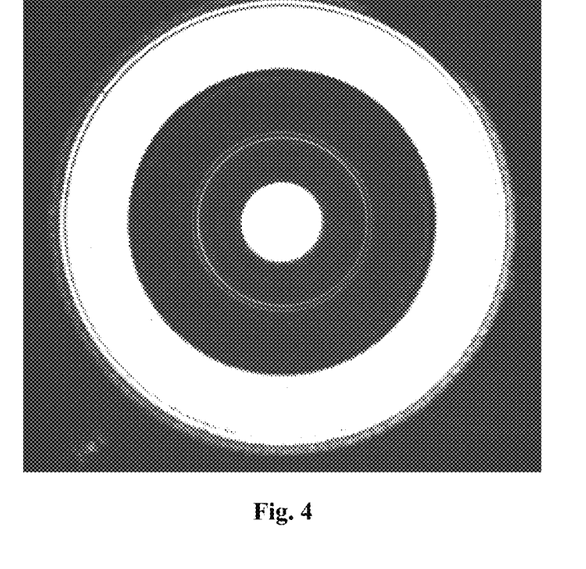
FIG. 4 shows a light reflection pupil image of the upper surface obtained by an upper imaging detector in an embodiment of the present invention.
Figure 5:
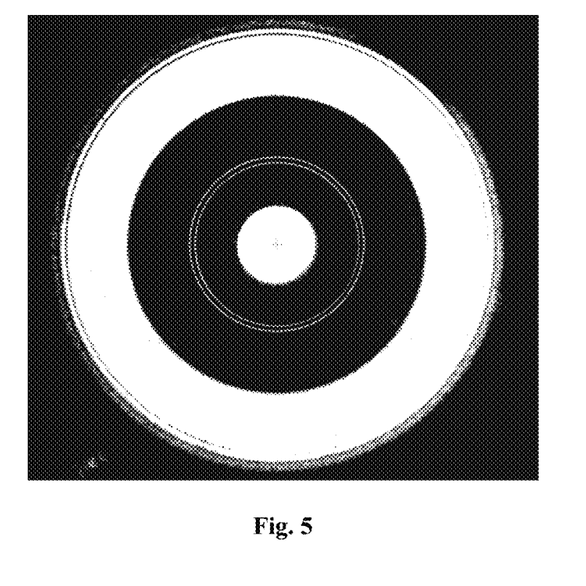
FIG. 5 shows a measurement result image of an optical axis center position of the upper surface in an embodiment of the present invention.
Figure 6:
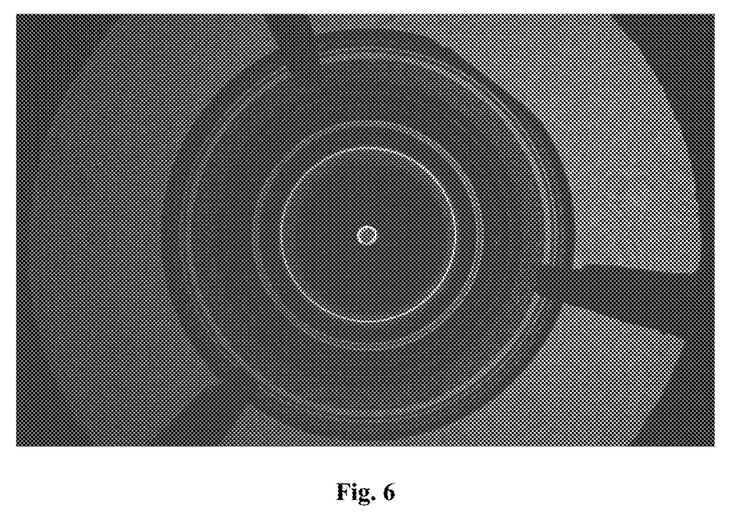
FIG. 6 shows a light transmittance pupil image of the upper surface obtained by the upper imaging detector in an embodiment of the present invention.
Figure 7:
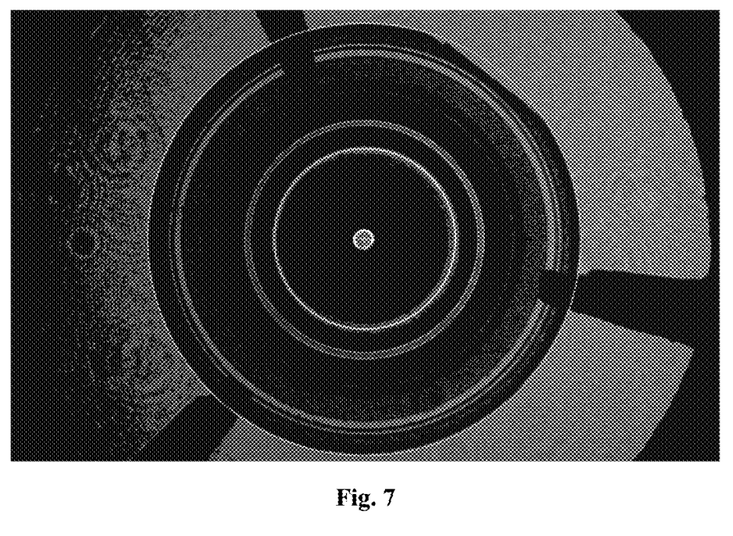
FIG. 7 shows a measurement result image of an outer diameter center position of the upper surface in an embodiment of the present invention.
Figure 8:
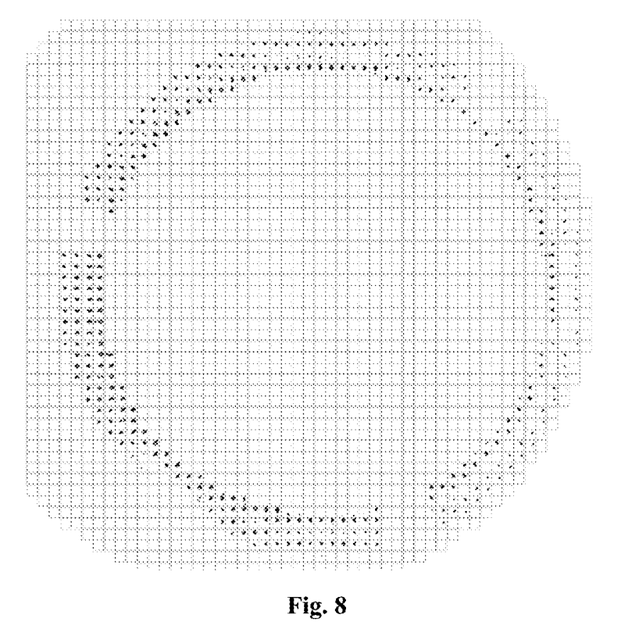
FIG. 8 shows a tilt wavefront image of a lower surface obtained by a lower wavefront sensor in an embodiment of the present invention.
Figure 9:
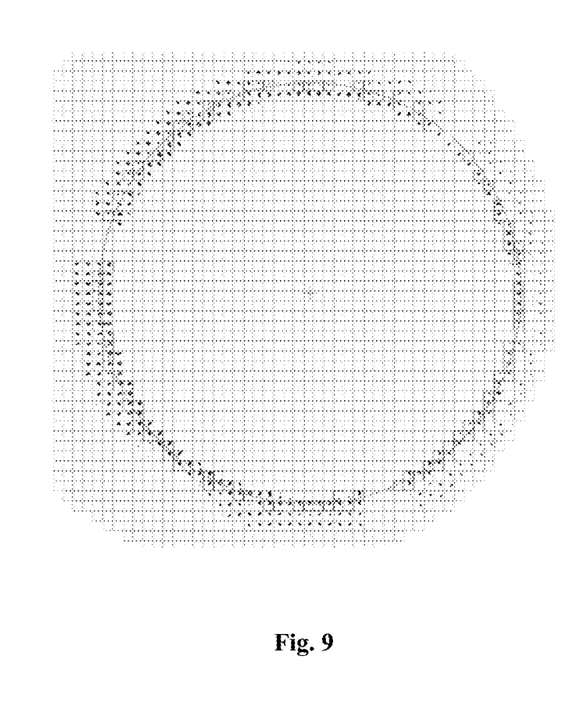
FIG. 9 shows a wavefront tilt amount image of the lower surface in an embodiment of the present invention.
Figure 10:
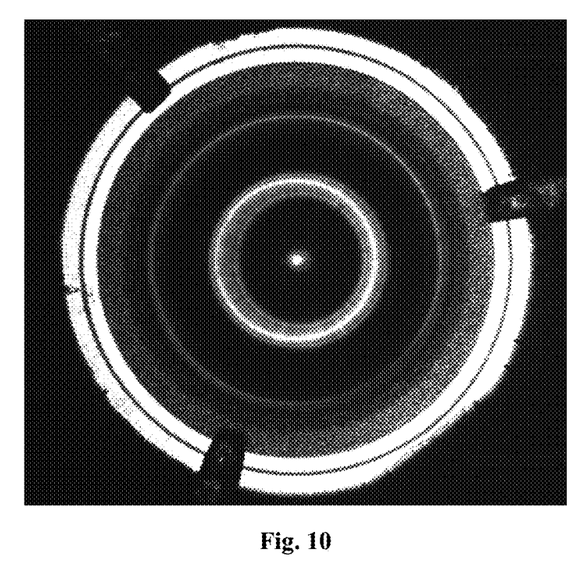
FIG. 10 shows a light reflection pupil image of the lower surface obtained by a lower wavefront sensor in an embodiment of the present invention.
Figure 11:
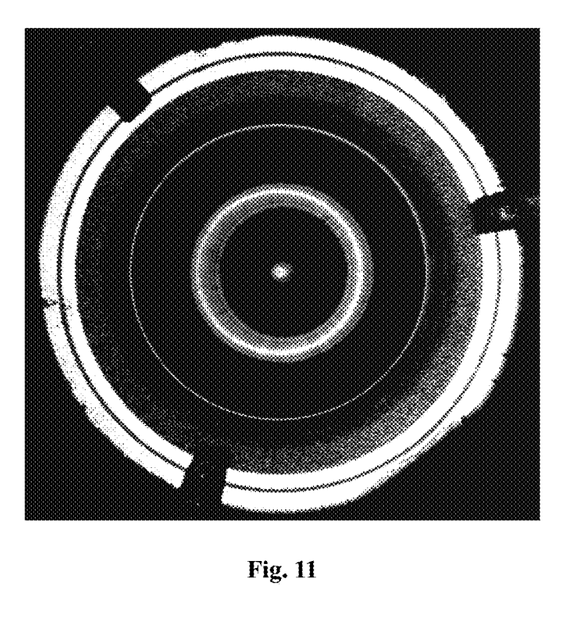
FIG. 11 shows an image of an optical axis center position of the lower surface in an embodiment of the present invention.
Figure 12:
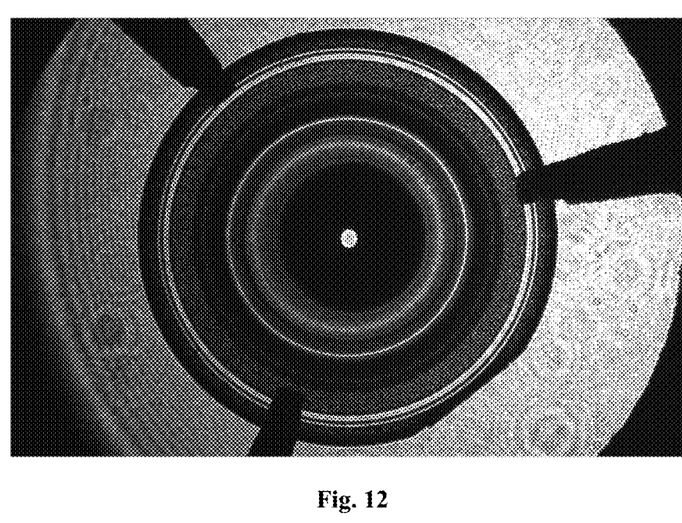
FIG. 12 shows a light transmittance pupil image of the lower surface acquired by a lower imaging detector in an embodiment of the present invention.
Figure 13:
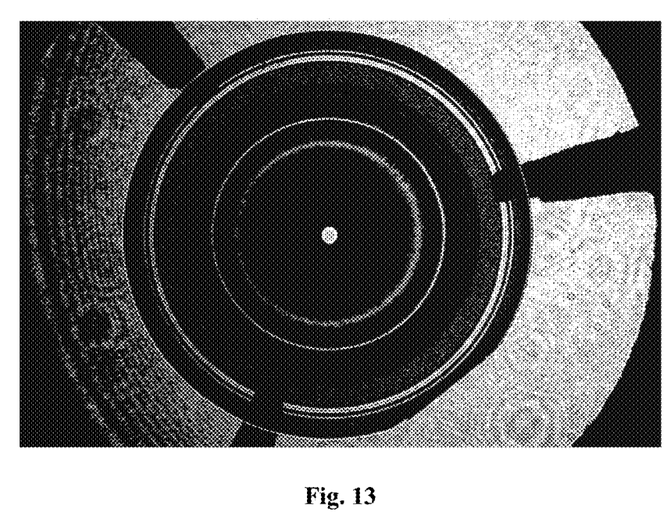
FIG. 13 shows an image of an outer diameter center position of the lower surface in an embodiment of the present invention.

Still further, in an embodiment, the detection result is: the tilt wavefront image of the upper surface obtained by the upper wavefront sensor 8 in step S2 is as shown in FIG. 2; referring to FIG. 3, the amount of tilt of the upper surface obtained after processing by the upper wavefront sensor 8 is (0.0019 mm, 0.0065 mm), and the overall amount of tilt is 0.0068 mm;

referring to FIG. 4, which shows the light reflection pupil image $J_p$ of the upper surface obtained by the upper imaging detector 6 in step S3; referring to FIG. 5, the measurement result of the optical axis center position of the upper surface is: coordinates of the optical axis center position are (4.8767 mm, 2.6132 mm), and the diameter is 0.9012 mm;

referring to FIG. 6, which shows the light reflection pupil image $I_p$ of the upper surface obtained by the upper imaging detector 6 in step S4; referring to FIG. 7, the measurement result of the optical axis center position of the upper surface is: coordinates of the optical axis center position are (4.8748 mm, 2.6197 mm), and the diameter is 2.4651 mm;

in step S9, the outer diameter eccentricity of the upper surface is (−0.755 degrees, −2.016 degrees);

referring to FIG. 8, which shows the tilt wavefront image of the lower surface obtained by the lower wavefront sensor 14 in step S5; referring to FIG. 9, the amount of tilt of the lower surface obtained after processing is (0.0101 mm, 0.0053 mm), and the overall amount of tilt of the lower surface is 0.0114 mm;

referring to FIG. 10, which shows the light reflection pupil image $J_p'$ of the lower surface obtained by the lower wavefront sensor 14 in step S6; referring to FIG. 11, coordinates of the optical axis center position of the lower surface are (4.5304 mm, 3.3342 mm), and the diameter is 1.5171 mm;

referring to FIG. 12, which shows the light transmittance pupil image $I_p'$ of the lower surface acquired by the lower imaging detector 15 in step S7; referring to FIG. 13, the outer diameter center position of the lower surface is (4.5203 mm, 3.3395 mm), and the diameter is 2.4675 mm; in step S10, the outer diameter eccentricity of the lower surface is (1.73 degrees, −3.924 degrees);

in step S8, the face-wise tilt eccentricity of the upper and lower surfaces is (0.0082 mm, 0.0118 mm), and the overall eccentricity is 0.144 mm; and the face-wise translation eccentricity of the upper and lower surfaces is (−0.3444 mm, 0.7145 mm).

Although the embodiments of the present invention have been disclosed above, they are not limited to those listed in the specification and the embodiments section, and they are absolutely applicable to various fields suitable for the present invention. Other modifications may be readily made by those skilled in the art. Thus, the present invention is not limited to the specific details if such modifications do not depart from the general concept defined by the claims and equivalents thereof.

The invention claimed is:

1. A detecting method for an aspheric lens eccentricity detecting device based on wavefront technology,
   wherein the aspheric lens eccentricity detection device comprises:
   an upper optical fiber light source, an upper collimating objective lens, an upper light source spectroscope, an upper beam-contracting front lens, an upper beam-contracting rear lens, an upper imaging detector, an upper imaging spectroscope, an upper wavefront sensor, a lens-under-detection clamping mechanism, a lower light source spectroscope, a lower beam-contracting front lens, a lower beam-contracting rear lens, a lower imaging spectroscope, a lower wavefront sensor, a lower imaging detector, a lower collimating objective lens and a lower optical fiber light source,
   wherein light emitted by the upper optical fiber light source is collimated by the upper collimating objective lens, then is transmitted through the upper light source spectroscope, and becomes incident to an upper surface of a lens under detection on the lens-under-detection clamping mechanism; reflected light on the upper surface of the lens under detection is reflected by the upper light source spectroscope, then is subjected to aperture matching by the upper beam-contracting front lens and the upper beam-contracting rear lens successively, and reaches the upper imaging spectroscope, and the light is divided into two parts after reaching the upper imaging spectroscope, one part thereof being reflected by the upper imaging spectroscope and entering the upper imaging detector, and the other part thereof being transmitted through the upper imaging spectroscope and entering the upper wavefront sensor; the upper imaging detector acquires an image formed by the reflected light on the upper surface of the lens under detection, and processes a variable-curvature ring image in the acquired image to obtain an optical axis center position of the upper surface of the lens under detection; and the upper wavefront sensor acquires distortion information of the reflected light on the upper surface of the lens under detection, and processes the distortion information to obtain tilt information of the upper surface of the lens under detection; and wherein light emitted by the lower optical fiber light source is collimated by the lower collimating objective lens, then is transmitted through the lower light source spectroscope, and becomes incident to a lower surface of the lens under detection on the lens-under-detection clamping mechanism; reflected light on the lower surface of the lens under detection is reflected by the lower light source spectroscope, then is subjected to aperture matching by the lower beam-contracting front lens and the lower beam-contracting rear lens successively, and reaches the lower imaging spectroscope, and the light is divided into two parts after reaching the lower imaging spectroscope, one part thereof being reflected by the lower imaging spectroscope and entering the lower imaging detector, and the other part thereof being transmitted through the lower imaging spectroscope and entering the lower wavefront sensor; the lower imaging detector acquires an image formed by the reflected light on the lower surface of the lens under detection, and processes a variable-curvature ring image in the acquired image to obtain an optical axis center position of the lower surface of the lens under detection;

and the lower wavefront sensor acquires distortion information of the reflected light on the lower surface of the lens under detection, and processes the distortion information to obtain tilt information of the lower surface of the lens under detection, wherein the detecting method comprises the following steps:

step S1: turning on the upper optical fiber light source, the upper imaging detector and the upper wavefront sensor simultaneously, and adjusting the lens-under-detection clamping mechanism according to an image on the upper imaging detector, to adjust the position of the lens under detection to an imaging center area of the upper imaging detector;

step S2: acquiring an image on the upper wavefront sensor and processing the wavefront image to obtain an amount of tilt $(p_x, p_y)$ of the upper surface of the lens under detection;

step S3: acquiring a pupil image $(J_p)$ on the upper imaging detector, and processing the pupil image to obtain an optical axis center position $(O_x, O_y)$ of the upper surface of the lens under detection;

step S4: turning off the upper optical fiber light source, turning on the lower optical fiber light source, acquiring a pupil image $(I_p)$ on the upper imaging detector, and performing calculation processing on the pupil image $(I_p)$ by using the method of step S3 to obtain an outer diameter center position $(d_x, d_y)$ of the upper surface of the lens under detection;

step S5: turning on the lower imaging detector and the lower wavefront sensor, acquiring an image on the lower wavefront sensor, and performing calculation processing according to component parameters of the lower wavefront sensor by using the method of step S2 to obtain an amount of tilt $(p_x', p_y')$ of the lower surface of the lens under detection;

step S6: acquiring a pupil image $(J_p')$ on the lower imaging detector, and performing calculation processing on the pupil image $(J_p')$ by using the method of step S3 to obtain an optical axis center position $(O_x', O_y')$ of the lower surface of the lens under detection;

step S7: turning off the lower optical fiber light source, turning on the upper optical fiber light source, acquiring a pupil image $(I_p')$ on the lower imaging detector, and performing calculation processing on the pupil image $(I_p')$ by using the method of step S3 to obtain an outer diameter center position $(d_x', d_y')$ of the lower surface of the lens under detection;

step S8: subtracting the amount of tilt of the upper surface of the lens under detection obtained in step S2 from the amount of tilt of the lower surface obtained in step S5 to obtain face-wise tilt eccentricity of the upper and lower surfaces of the lens under detection: $(\overline{p_x}, \overline{p_y}) = (p_x', p_y') - (p_x, p_y)$; and subtracting the optical axis center position of the upper surface obtained in step S3 from the optical axis center position of the lower surface obtained in step S6, to obtain face-wise translation eccentricity of the upper and lower surfaces of the lens under detection: $O = (O_x', O_y') - (O_x, O_y)$;

step S9: according to the optical axis center position $(O_x, O_y)$ of the upper surface obtained in step S3 and the outer diameter center position $(d_x, d_y)$ of the upper surface obtained in step S4, obtaining outer diameter eccentricity of the upper surface of the lens under detection:

$$D = \frac{p}{K}(d_x - O_x, d_y - O_y)$$

wherein the parameter K is a magnification of a beam-contracting-expanding optical system composed of the upper beam-contracting front lens and the upper beam-contracting rear lens, and the parameter p is the pixel size of the upper imaging detector; and step S10: according to the optical axis center position $(Ox', O_y')$ of the lower surface obtained in step S6 and the outer diameter center position $(dx, dy)$ of the lower surface obtained in step S7, obtaining outer diameter eccentricity of the lower surface of the lens under detection:

$$D' = \frac{p'}{K'}(d_x' - O_x', d_y' - O_y')$$

wherein the parameter K' is a magnification of a beam-contracting-expanding optical system composed of the lower beam-contracting front lens and the lower beam-contracting rear lens, and the parameter p' is the pixel size of the lower imaging detector.

2. The aspheric lens eccentricity detecting method according to claim 1, wherein the light emitted by the lower optical fiber light source is collimated by the lower collimating objective lens to form a parallel light beam, which is transmitted through the lower light source spectroscope, becomes incident to the lens under detection on the lens-under-detection clamping mechanism, and is reflected by the upper light source spectroscope after passing through the lens under detection, and then the light reflected therefrom is subjected to aperture matching by the upper beam-contracting front lens and the upper beam-contracting rear lens successively, and reaches the upper imaging spectroscope; and part of the light is reflected by the upper imaging spectroscope and reaches the upper imaging detector to form a light transmittance image of the lens under detection, and an outer edge image of the lens under detection in the formed image is processed to obtain the outer diameter center position of the upper surface of the lens under detection.

3. The aspheric lens eccentricity detecting method according to claim 2, wherein the light emitted by the upper optical fiber light source is collimated by the upper collimating objective lens to form a parallel light beam, which is transmitted through the upper light source spectroscope, becomes incident to the lens under detection on the lens-under-detection clamping mechanism, and is reflected by the lower light source spectroscope after passing through the lens under detection, and then the light reflected therefrom is subjected to aperture matching by the lower beam-contracting front lens and the lower beam-contracting rear lens successively, and reaches the lower imaging spectroscope; and part of the light is reflected by the lower imaging spectroscope and reaches the lower imaging detector to form a light transmittance image of the lens under detection, and an outer edge image of the lens under detection in the formed image is processed to obtain the outer diameter center position of the lower surface of the lens under detection.

4. The aspheric lens eccentricity detecting method according to claim 3, wherein the positions of the upper imaging detector and the upper wavefront sensor in the optical path are both conjugate with the upper surface of the lens under detection; and the positions of the lower imaging detector and the lower wavefront sensor in the optical path are both conjugate with the lower surface of the lens under detection.

5. The aspheric lens eccentricity detecting method according to of claim 4, wherein the optical axis center position information of the upper surface, the tilt information of the upper surface, the outer diameter center position information of the upper surface, the optical axis center position information of the lower surface, the outer diameter center position information of the lower surface, and the tilt information of the lower surface obtained for the lens under detection are subjected to comprehensive processing, to finally obtain data of the face-wise translation eccentricity of the upper and lower surfaces, the face-wise tilt eccentricity of the upper and lower surfaces, the outer diameter eccentricity of the upper surface, and the outer diameter eccentricity of the lower surface, of the lens under detection, thereby measuring eccentricity error information of the lens under detection.

6. The aspheric lens eccentricity detecting method according to claim 4, wherein the upper and/or lower wavefront sensor is a Hartmann wavefront sensor or a shearing interference wavefront sensor or a quadrangular pyramid wavefront sensor.

7. The aspheric lens eccentricity detecting method according to claim 5, wherein the optical axis center position information of the upper surface, the tilt information of the upper surface, the outer diameter center position information of the upper surface, the optical axis center position information of the lower surface, the outer diameter center position information of the lower surface, and the tilt information of the lower surface obtained for the lens under detection are subjected to comprehensive processing, to finally obtain data of the face-wise translation eccentricity of the upper and lower surfaces, the face-wise tilt eccentricity of the upper and lower surfaces, the outer diameter eccentricity of the upper surface, and the outer diameter eccentricity of the lower surface, of the lens under detection, thereby measuring eccentricity error information of the lens under detection.

8. The aspheric lens eccentricity detecting method according claim 3, wherein the optical axis center position information of the upper surface, the tilt information of the upper surface, the outer diameter center position information of the upper surface, the optical axis center position information of the lower surface, the outer diameter center position information of the lower surface, and the tilt information of the lower surface obtained for the lens under detection are subjected to comprehensive processing, to finally obtain data of the face-wise translation eccentricity of the upper and lower surfaces, the face-wise tilt eccentricity of the upper and lower surfaces, the outer diameter eccentricity of the upper surface, and the outer diameter eccentricity of the lower surface, of the lens under detection, thereby measuring eccentricity error information of the lens under detection.

9. The aspheric lens eccentricity detecting method based on wavefront technology according to claim 1, wherein step S2 specifically comprises:

step S21: acquiring a wavefront image on the upper wavefront sensor;

step S22: detecting effective sub-apertures of an outermost ring in the wavefront image, after removing sub-apertures of an outermost circle and an innermost circle thereof, the remaining sub-apertures being referred to as effective sub-apertures; and letting the number of the effective sub-apertures be L, and calculating the slope of each effective sub-aperture, denoted by $(g_{xi}, g_{yi})$ wherein i=1, 2, . . . , L;

step S23: calculating the average slope of the effective sub-apertures:

$$(g_x, g_y) = \frac{1}{L}\sum_{i=1}^{L}(g_{xi}, g_{yi});$$

and step S24: calculating the amount of tilt of the upper surface of the lens under detection:

$$(p_x, p_y) = \frac{p}{K \cdot q} \cdot (g_x, g_y),$$

wherein the parameter K is a magnification of a beam-contracting-expanding optical system composed of the upper beam-contracting front lens and the upper beam-contracting rear lens, the parameter p is the pixel size of a detecting camera of the upper wavefront sensor, and the parameter q is the sub-aperture size of the upper wavefront sensor.

10. The aspheric lens eccentricity detecting method based on wavefront technology according to claim 9, wherein step S3 specifically comprises:

step S31: acquiring a pupil image ($J_p$) on the upper imaging detector;

step S32: binarizing the pupil image ($J_p$) to obtain a binarized image ($J_{p2}$), wherein a binarization threshold is set by manually specifying a threshold or using an automatic threshold calculation method;

step S33: performing edge extraction on the binarized image ($J_{p2}$) to obtain an image ($J_{p3}$);and step S34: performing a circle Hough transformation on the image ($J_{p3}$) to obtain a circle, and extracting the center of the circle, denoted as $(O_x, O_y)$, which is the optical axis center position of the upper surface of the lens under detection.

11. The aspheric lens eccentricity detecting method based on wavefront technology according to claim 10, wherein edge extraction is performed on the binarized image ($J_{p2}$) by using a Sobel operator or a Laplacian operator or a Canny operator in step S33.

\* \* \* \* \*